H. TSCHERNING.
MOLDING MACHINE.
APPLICATION FILED NOV. 8, 1911.

1,103,454.

Patented July 14, 1914.
6 SHEETS—SHEET 1.

Witnesses:
John Enders
Ralph Schaefer

Inventor:
Henry Tscherning
By Dyrenforth, Lee, Chritton & Wiles
Attys

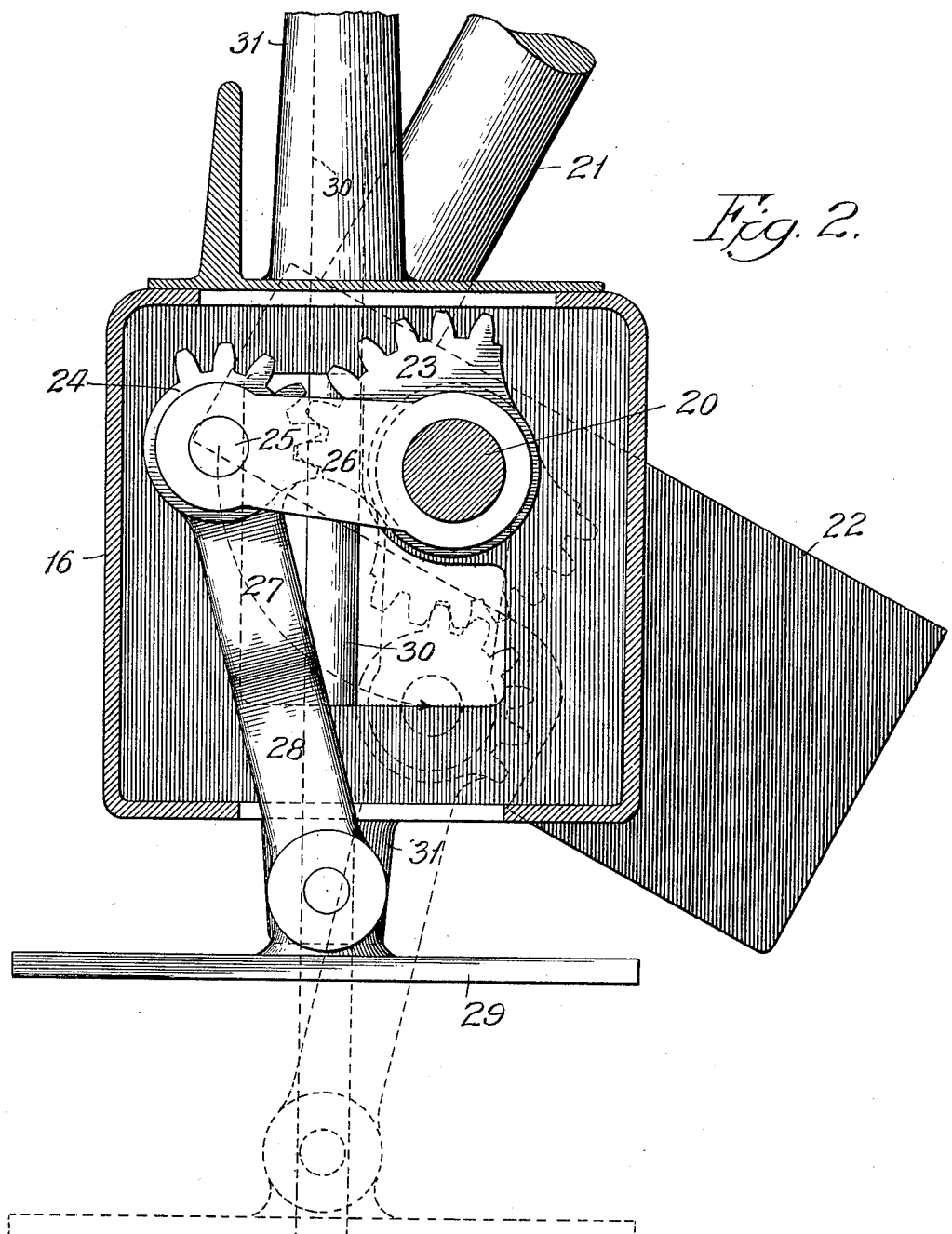

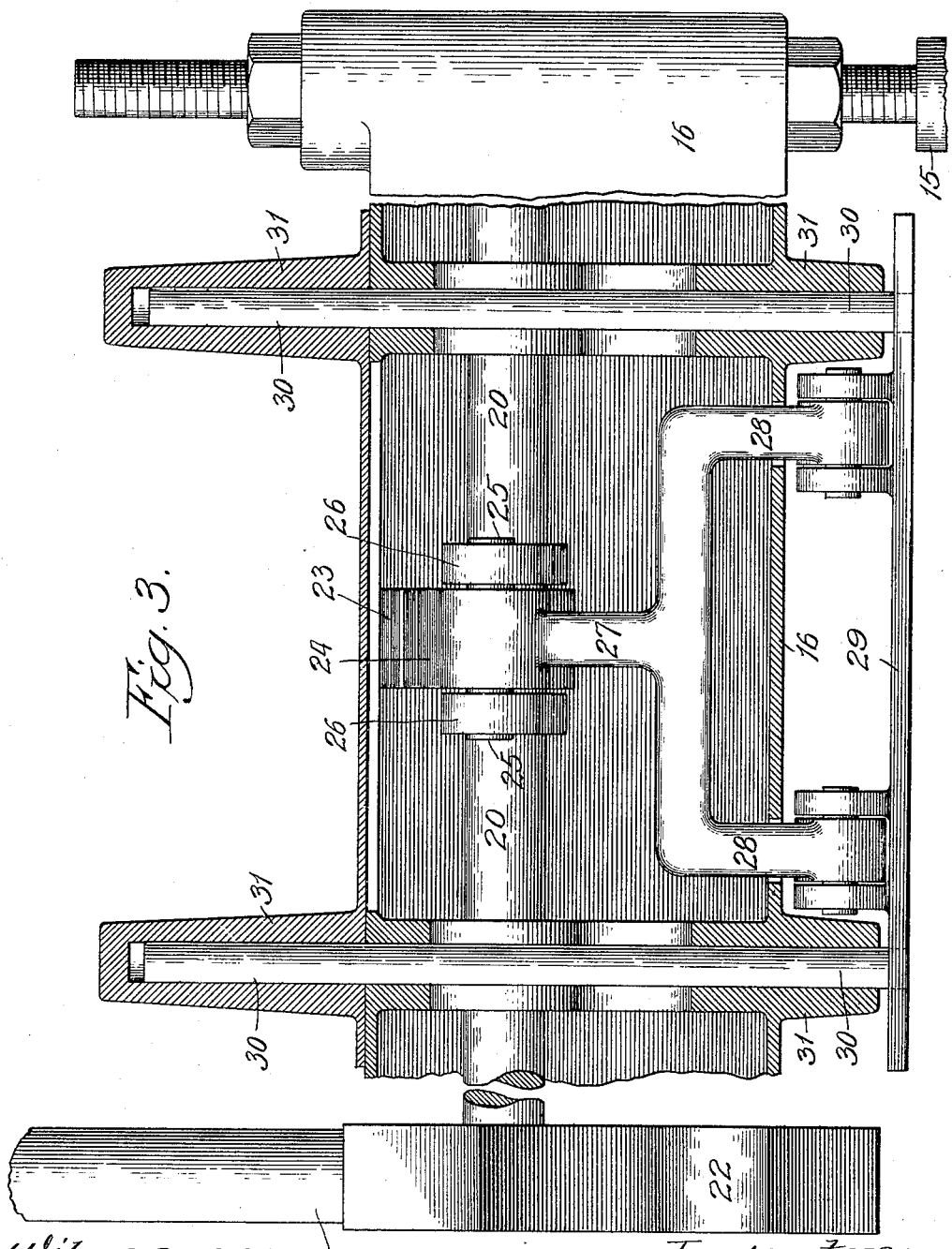

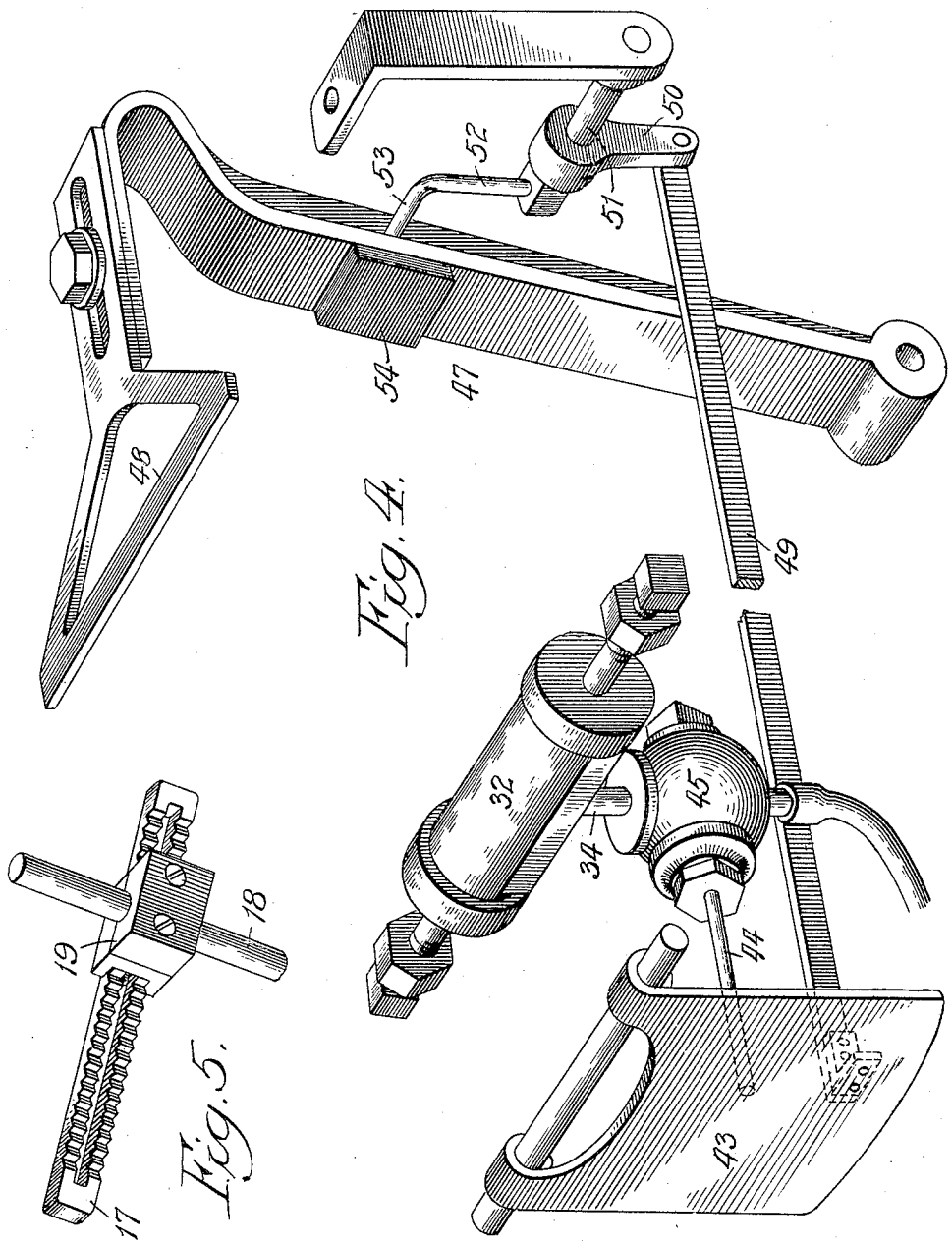

H. TSCHERNING.
MOLDING MACHINE.
APPLICATION FILED NOV. 8, 1911.
1,103,454.
Patented July 14, 1914.
6 SHEETS—SHEET 5.
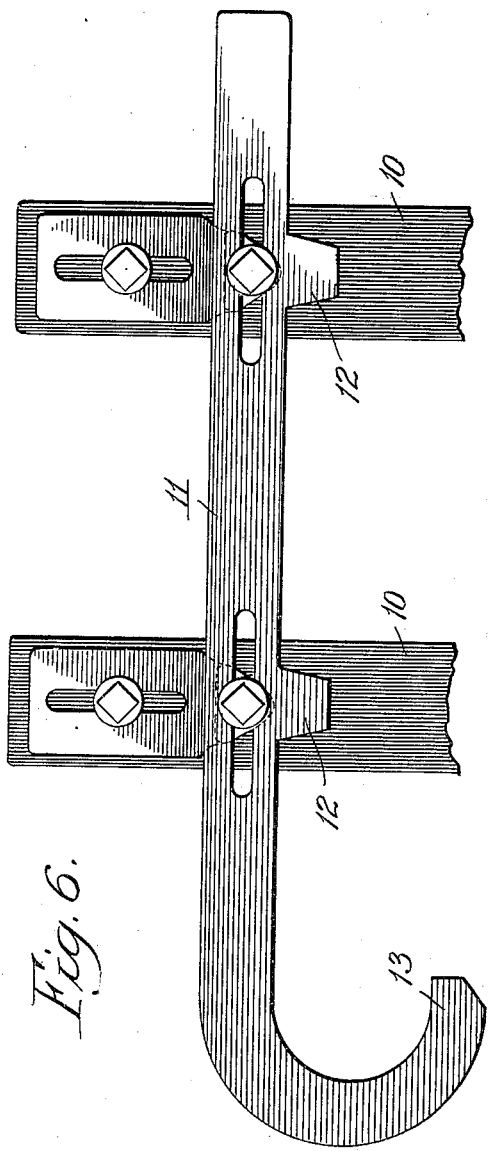
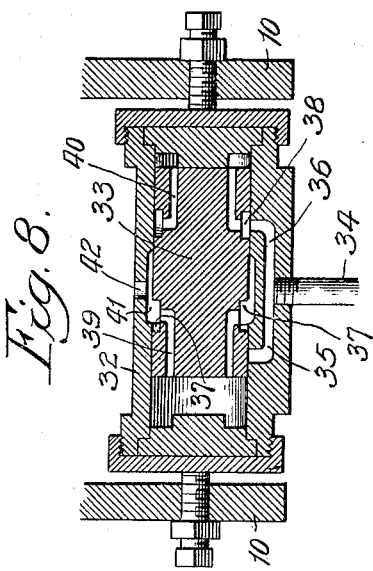
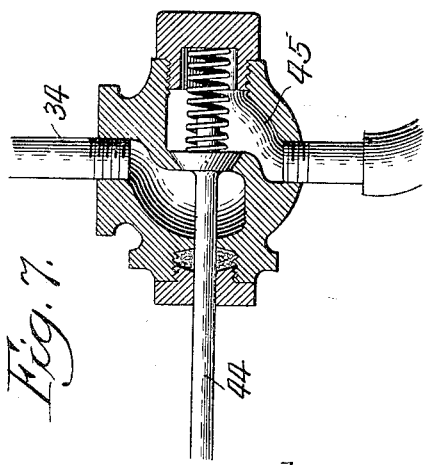
Witnesses:
John Enders
Ralph Schafer
Inventor:
Henry Tscherning
By Dyrenforth, Lee, Chritton & Wiles,
Attys.

H. TSCHERNING.
MOLDING MACHINE.
APPLICATION FILED NOV. 8, 1911.

1,103,454.

Patented July 14, 1914.
6 SHEETS—SHEET 6.

Witnesses
P. A. Blair
K. E. Klein

Inventor
Henry Tscherning.
By Lynnford Lee, Chitton Wills
Attorneys.

UNITED STATES PATENT OFFICE.

HENRY TSCHERNING, OF FREEPORT, ILLINOIS, ASSIGNOR TO ARCADE MANUFACTURING COMPANY, OF FREEPORT, ILLINOIS, A CORPORATION OF ILLINOIS.

MOLDING-MACHINE.

1,103,454.        Specification of Letters Patent.      Patented July 14, 1914.

Application filed November 8, 1911. Serial No. 659,077.

*To all whom it may concern:*

Be it known that I, HENRY TSCHERNING, a citizen of the United States, residing at Freeport, in the county of Stephenson and State of Illinois, have invented a new and useful Improvement in Molding-Machines, of which the following is a specification.

My invention relates to an improved molding machine which is fully described in the following specification and illustrated in the accompanying drawings, in which—

Figure 1:
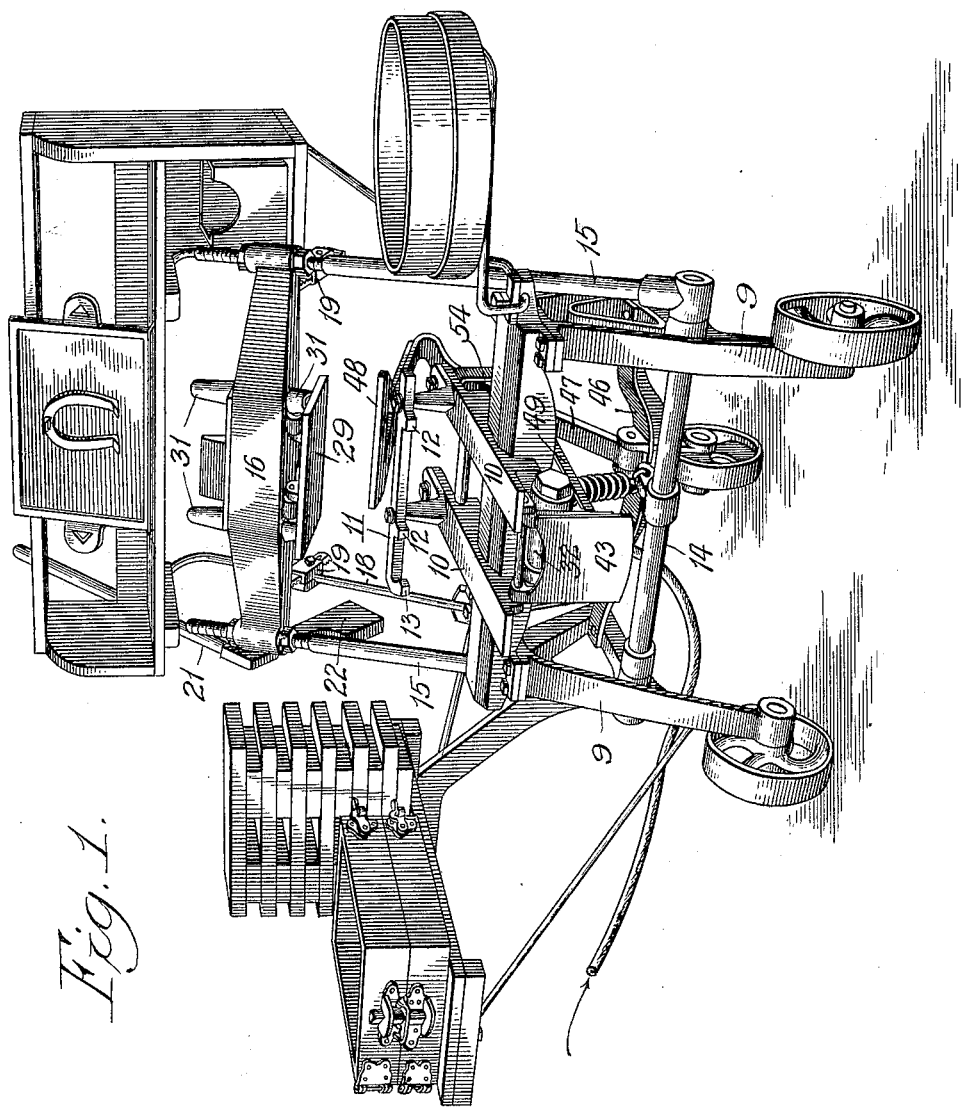
Figure 9:
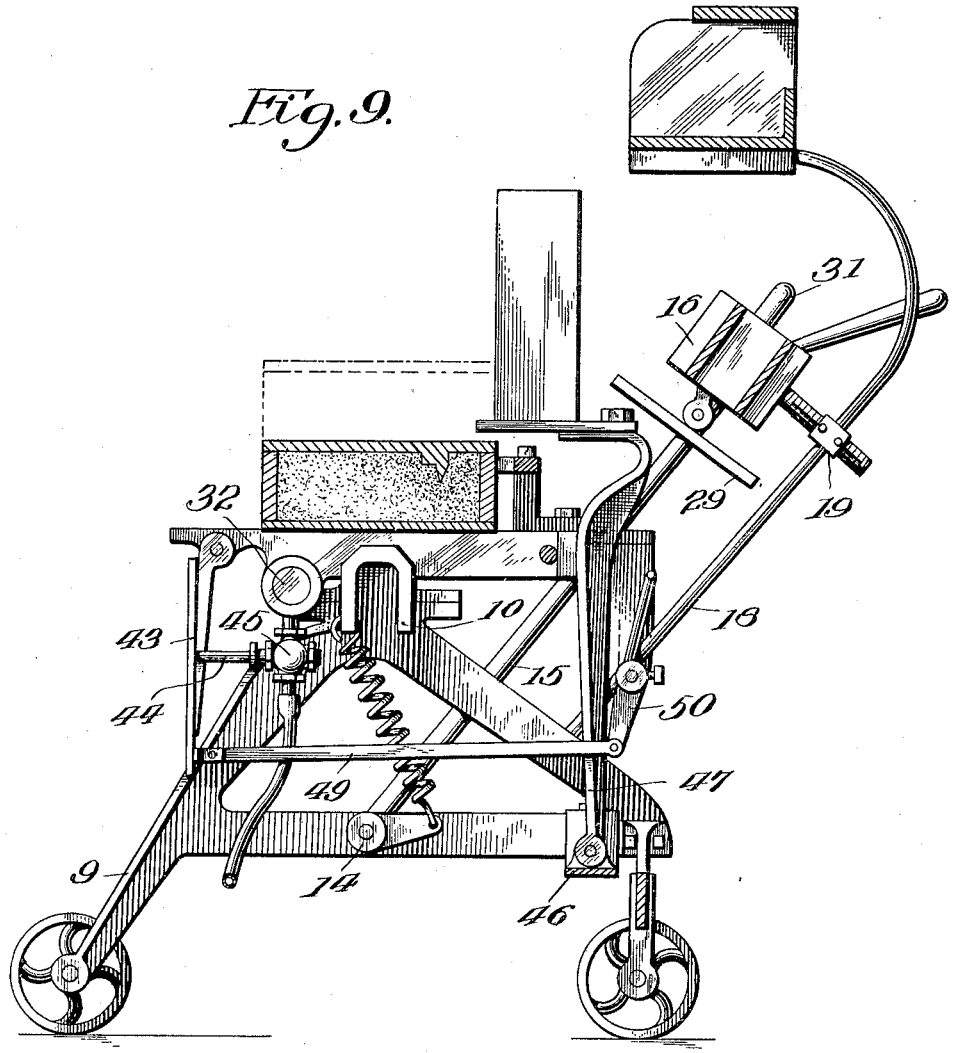

Figure 1 is a perspective view of the improved device; Fig. 2 is a central cross-section through the head; Fig. 3 is a view of the parts shown in Fig. 2 at right angles to that view, the head-casing being shown in section and the remaining parts in elevation; Fig. 4 is a perspective view of the rapper and the mold-supporting device; Fig. 5 is a perspective view of the head-stop showing its method of adjustment; Fig. 6 is a plan of the flask-guide; Fig. 7 is a section through the rapper-valve; Fig. 8 is a section through the rapper-cylinder; and Fig. 9 is a central longitudinal section through the platform and cope-support showing the forward and operative position of the latter.

Referring to the drawings, 9 indicates generally a base which is provided with suitable wheels whereby it may readily be transported from place to place, and this base carries a platform composed of two bars 10 extending from front to back and adapted to receive a flask which, when placed thereon, is positioned by a flask-guide 11 adjustable from front to back and also laterally. This guide has lugs 12 which engage the rear of the flask and a hooded end 13 to engage one side of the flask, so that when placed upon the bars 10 and pushed into position against the flask-guide, the flask will be properly positioned. Journaled upon a shaft 14 are upwardly extending arms 15 which support a head-frame 16 and the same can be swung forward and back from a position directly over the position of the flask, in which case the arms 15 are vertical, to a rearward position, where it contacts with adjustable head-stops 17 clamped on bars 18 which extend diagonally upward and backward from the base. The head-stops are supported as shown in Fig. 5 and adjustable through clamps 19 in an obvious manner, the purpose being to swing the head back far enough to give convenient space for working upon the flask but not unduly far back so as to cause unnecessary labor in returning it to operative position. The head-frame 16 has journaled in it, and extending from side to side, a rock-shaft 20 oscillatable by means of a handle 21 counterweighted by a weight 22. The shaft 20 carries a segmental pinion 23 in mesh with a segmental pinion 24 on a countershaft 25 which is connected to the shaft 20 by links 26 pivoted mutually upon the shaft 20 and countershaft 25, so that the countershaft may swing from the position shown in solid, to that shown in dotted lines in Fig. 2. The segmental pinion 24 is formed integral with an arm 27 bifurcated at its lower end to form ends 28 which are pivotally connected to the squeezer-plate 29 which is provided with upwardly extending pins 30 running in guides 31 on the head-frame 16. The result of this construction is that as the handle 21 is swung forward, the pinions 23 and 24 will rotate, forcing the countershaft 25 downward, and simultaneously causing the arm 27 to take the position shown in dotted lines in Fig. 2. The squeezer-plate 29 is thus forced downward, moving very slowly at its lower limit of movement, and with a very powerful leverage. The entire squeezer-head 16 is made adjustable on the upper ends of the arms 15 so that this powerful movement will occur just at the right position to squeeze the contents of the flask.

The present device is designed to be used with a pattern-plate of the type having half the pattern in relief on each side, so that by placing the plate between the cope and drag, filling cope and drag with sand and squeezing the whole, the two halves of the mold are made at one operation. In the use of the machine, the pattern-plate is placed in position between the two halves of the flask, which may be and preferably is a snap-flask, and the flask is placed on the bars 10 with the drag up, the head being swung back out of the way. The drag is first filled with sand in the usual manner—that is, by riddling sand onto the pattern-plate to make a sufficient layer, doing whatever tucking in deep parts of the pattern may be necessary, by hand, then shoveling the rest of the sand into place, striking off, and putting the follower-board in position. The flask is then turned over so that the follower-board rests on the bars 10 and the empty cope is up. The cope is then filled with sand in the same manner and a second follower-board is placed upon it. The head is then swung forward and the squeezer-plate brought down by manipulation of the handle, it being understood that when this operation is performed, the flask is accurately positioned by engagement with the flask-guide. The operation of the squeezer-plate compresses the sand within the mold to the requisite degree and the squeezer-plate is then elevated and the head swung back. This completes the making of the mold, but to use it, it is necessary that these halves be separated and the pattern-plate removed, which brings into operation the rapping mechanism, which will now be described.

Mounted between the bars 10 is a pneumatic rapper-cylinder 32 containing a piston 33. The cylinder receives compressed air from a pipe 34 communicating with two intake ports 35 and 36, one for each end of the cylinder. The piston is provided with annular grooves 37 and 38 at its two ends, communicating by ports 39 and 40 cut in the material of the piston, with spaces at its two ends, and the cylinder is provided with a central annular groove 41 communicating with the exhaust-port 42. When air is admitted to the intake-ports it will enter one or the other of the annular grooves 37 or 38, as the case may be, passing therefrom to the space at one end of the cylinder, and at the same time the other annular groove will be in registration with the annular groove 41 in the cylinder and so in communication with the exhaust-port. The result will be that air pressure will occur in one end of the cylinder, while the other will be freely open to the atmosphere, so that the piston will move forcibly from the end where the pressure is to the opposite end, striking the end of the cylinder and agitating the bars 10 upon which the flask rests. This movement of the cylinder will, in an obvious manner, reverse the connections, venting the side to which pressure first passed, and admitting pressure to the opposite side. Thus, as long as air pressure is maintained, the piston will oscillate back and forth within the cylinder, imparting a series of rapid shocks to the bars 10 and effectively rapping the mold. Pivoted to the forward end of the bars 10 is a knee-plate 43 which is adapted to be struck by the knee of the operator. This has been found to be the most convenient method of operating the rapper and other parts connected therewith. The operator's hands are of course both used in manipulating the flask when the mold-sections are being separated. The machine usually stands on a dirt floor with large quantities of loose sand, which would seriously interfere with the effective operation of a foot-lever, but it is found that with the relatively large knee-plate 43, the operator can conveniently move it with a slight forward swing of one leg without in any way interfering with his hand operations on the flask or disturbing his equilibrium in performing the relatively delicate work of handling the mold. The knee-plate 43 contacts with a valve-stem 44 and an air-valve 45, the construction of which is shown in detail in Fig. 7, and it will need no further description except to state that its intake side is connected to a source of compressed air through a flexible pipe, and its exhaust side is connected with the intake pipe 34 of the rapper-cylinder. Thus, as long as the operator holds the knee-plate in its rearward position, the rapping continues.

During the first operation of the rapper, the cope is drawn from the pattern-plate. It is, however, necessary for rapid operation that there be provided some place upon which the cope, with its sand, may be placed during the drawing of the pattern-plate from the drag, and this support should be such a support as will be unaffected by the agitation of the bars 10 in the second rapping, which is necessary for the separation of the pattern-plate and drag. For the purpose of furnishing this support, a spring 46 is provided on the base of the machine and this furnishes pivotal support for a cope-carrier 47 which has a long, upwardly-extending arm, reaching above the level of the flask-guide, the upper end of which is turned forward and provided with an adjustable flat plate 48. Connected to the knee-plate 43 is a link 49 connected to an arm 50 and a rock-shaft 51 at one end of which is an upwardly extending finger 52 having a tip 53 turned at right angles to engage with the cope-carrier 47. When the knee-plate is pushed backward the first time, the link 49 moves backward and in an obvious manner causes the cope-carrier to swing forward. The cope-carrier is so pivoted that at the extreme backward point of the link 49 the center of gravity of the cope-carrier moves to the front of its pivot and the cope-carrier therefore swings forward away from the tip 53 of the finger 52 until a rubber or elastic stop 54 on the cope-carrier engages a stationary part of the frame. The cope can then be stood on edge on the plate 48 of the cope-carrier in a position nearly vertical but inclining slightly backward with its upper edge resting against the forward edge of the squeezer-plate. The knee-plate is then pressed a second time and the pattern-plate drawn, but in this operation the cope-support is wholly unaffected by the movement of the link 49 because it is swung forward out of the possible range of movement of the tip 53 of the finger 52. Furthermore, the cope-support, being supported on a spring, is freed from the vibratory influence of the rapper. The use of the rubber stop 54 aids in protecting the cope-support against jars.

After the pattern-plate is drawn, the cope is lifted down and placed upon the drag, the flask is unsnapped and removed from the finished mold, and the mold carried away to the floor. As a matter of practice, the operator so manipulates the mold in unsnapping it that it strikes the cope-support, pushing it a slight distance backward, enough for its center of gravity to swing back of its pivot so that gravity returns it to its normal position out of the path of the squeezer-plate on the next succeeding operation of the machine.

I realize that considerable variation is possible in the details of this construction and by having described the same fully, I do not intend to limit myself to the specific construction described except as pointed out in the following claims in which my intention is to set forth all the novelty inherent in the construction as broadly as the state of the art will permit.

What I claim as new and desire to secure by Letters Patent is—

1. In a molding-machine, a base, pivoted arms extending upward therefrom, a head carried thereby, an operating lever carried by the head, a squeezer-plate, a rock-shaft connected to the operating lever, a pinion thereon, a countershaft revoluble about the first-mentioned shaft, an arm with an integral pinion on said countershaft, said pinion meshing with said first-named pinion, and connections between said arm and the squeezer-plate.

2. In a molding-machine, a base, a head, a shaft in the head, an operating lever secured to the shaft, a countershaft revoluble about said shaft and connected therewith by links, meshing pinions on the shaft and countershaft, an arm connected to the countershaft pinion, and a squeezer-plate connected to the arm.

3. In a molding-machine, a base, a head, a shaft in the head, an operating lever secured to the shaft, a countershaft revoluble about said shaft and connected therewith by links, meshing pinions on the shaft and countershaft, an arm connected to the countershaft pinion, a squeezer-plate connected to the arm, and guides on the head for the squeezer-plate.

4. In combination, a flask-supporting base and a movable squeezer-plate to oppose the same, a cope-support movable forward to receive the cope, and backward out of the path of the squeezer-plate.

5. In a molding-machine, a platform for receiving a flask, a rapping device for agitating the same, a movably mounted cope-support independent of the platform and adapted to receive the cope while the platform is being agitated for work on the drag, means for operating the rapping device, and means operating simultaneously with the rapping device for advancing the cope-support into operative position.

6. In a molding-machine, a resiliently mounted cope-support, a pneumatic rapper, and means for operating the rapper and simultaneously advancing the cope-support.

7. In a molding-machine, a resiliently mounted cope-support, a pneumatic rapper, means for operating the rapper and simultaneously advancing the cope-support, the cope-support being arranged, when moved, to advance automatically beyond the throw of its advancing means.

8. In a molding-machine, a pivoted cope-support, a pneumatic rapper, a valve for controlling the same, a movable knee-plate to operate the valve, and means operated by the knee-plate for advancing the cope-support.

9. In a molding-machine, a pivoted cope-support, a pneumatic rapper, a valve for controlling the same, a movable knee-plate to operate the valve, and means operated by the knee-plate for advancing the cope-support, the cope-support, when advanced, swinging past a dead center out of contact with its advancing means.

10. In a molding-machine, a pivoted cope-support, a pneumatic rapper, a valve for controlling the same, a movable knee-plate to operate the valve, means operated by the knee-plate for advancing the cope-support, the cope-support, when advanced, swinging past a dead center out of contact with its advancing means, and an elastic stop for the cope-support.

HENRY TSCHERNING.

In presence of—
REEVE BURTON,
E. H. MORGAN.